United States Patent
Wunsch

(10) Patent No.: US 9,550,628 B2
(45) Date of Patent: Jan. 24, 2017

(54) MODULE FOR A MODULAR CONVEYOR BELT

(75) Inventor: Philip J. Wunsch, Metairie, LA (US)

(73) Assignee: Laitram, L.L.C., Harahan, LA (US)

(*) Notice: Subject to any disclaimer, the term of this patent is extended or adjusted under 35 U.S.C. 154(b) by 1527 days.

(21) Appl. No.: 12/742,860

(22) PCT Filed: Dec. 23, 2008

(86) PCT No.: PCT/US2008/088192
§ 371 (c)(1),
(2), (4) Date: May 13, 2010

(87) PCT Pub. No.: WO2009/086395
PCT Pub. Date: Jul. 9, 2009

(65) Prior Publication Data
US 2010/0258410 A1    Oct. 14, 2010

Related U.S. Application Data

(60) Provisional application No. 61/009,161, filed on Dec. 27, 2007, provisional application No. 61/136,182, filed on Aug. 18, 2008.

(51) Int. Cl.
*B65G 17/40* (2006.01)
*B65G 17/38* (2006.01)
*B65G 17/06* (2006.01)
*B65G 17/08* (2006.01)

(52) U.S. Cl.
CPC ............ *B65G 17/40* (2013.01); *B65G 17/08* (2013.01); *B65G 2207/12* (2013.01); *Y10T 29/49815* (2015.01)

(58) Field of Classification Search
USPC .............................. 198/844.1, 850
See application file for complete search history.

(56) References Cited

U.S. PATENT DOCUMENTS

| | | |
|---|---|---|
| 4,114,467 A | 9/1978 | Petershack |
| 4,709,807 A | 12/1987 | Poerink |
| 4,832,187 A | 5/1989 | Lapeyre |
| 4,858,753 A | 8/1989 | Hodlewsky |
| 4,893,710 A | 1/1990 | Bailey et al. |
| 5,000,312 A | 3/1991 | Damkjaer |
| 5,058,732 A | 10/1991 | Lapeyre |
| 5,083,660 A | 1/1992 | Horton |
| 5,156,264 A | 10/1992 | Lapeyre |
| 5,217,110 A | 6/1993 | Spangler et al. |
| 5,253,749 A | 10/1993 | Ensch |
| 5,293,989 A | 3/1994 | Garbagnati |
| 5,303,818 A | 4/1994 | Gruettner et al. |
| 5,332,084 A | 7/1994 | Greve |
| 5,335,768 A | 8/1994 | Schladweiler et al. |
| 5,435,435 A | 7/1995 | Chiba et al. |
| 5,482,156 A | 1/1996 | Damkjaer |
| 5,586,644 A | 12/1996 | Coen et al. |
| 5,598,916 A | 2/1997 | Horton et al. |
| 5,645,160 A | 7/1997 | Palmaer et al. |

(Continued)

*Primary Examiner* — Kavel Singh
(74) *Attorney, Agent, or Firm* — James T. Cronvich

(57) ABSTRACT

A module for a modular conveyor belt includes a flexible retainer for retaining a hinge rod in a bore of the module. A stopper limits the bending movement of the retainer and supports the midportion of the retainer to prevent stresses generated in the retainer from exceeding its design stress.

14 Claims, 10 Drawing Sheets

(56) References Cited

U.S. PATENT DOCUMENTS

| | | | |
|---|---|---|---|
| 5,662,211 A | 9/1997 | Quentin | |
| 5,816,390 A | 10/1998 | Stebnicki | |
| 5,826,705 A | 10/1998 | Ramsey et al. | |
| 5,899,322 A | 5/1999 | Gamble, Jr. | |
| 5,904,241 A | 5/1999 | Verdigets et al. | |
| 5,996,776 A | 12/1999 | van Zijderveld | |
| 6,308,825 B1 | 10/2001 | Nakamura | |
| 6,499,587 B1 | 12/2002 | Greve | |
| 6,565,689 B2 * | 5/2003 | Geib | B29C 70/086 156/137 |
| 6,763,936 B2 | 7/2004 | Marsetti et al. | |
| 6,814,223 B1 | 11/2004 | Verdigets et al. | |
| 6,857,516 B1 * | 2/2005 | Verdigets | B65G 17/40 198/844.1 |
| 7,255,227 B2 | 8/2007 | Melancon | |

\* cited by examiner

MODULE FOR A MODULAR CONVEYOR BELT

BACKGROUND OF THE INVENTION

This invention relates to a module for a modular conveyor belt which has a retainer for retaining a hinge rod in the module and which enables a hinge rod to be retracted from the module without damaging the retainer.

A modular conveyor belt is a conveyor belt formed from a plurality of units (referred to as modules) pivotably connected to each other end to end in series. Modular conveyor belts are popular in the product handling industry because the length of such conveyor belts can be readily adjusted by varying the number of modules making up the conveyor belts. Furthermore, a modular conveyor belt is easy to repair when worn or damaged by simply replacing any worn or damaged modules without it being necessary to replace the entire conveyor belt.

The modules forming a modular conveyor belt are pivotably connected in series by elongated hinge rods which pass through aligned bores formed in the modules. Various means have been employed to prevent the hinge rods from inadvertently becoming detached from the modules during operation or handling of a modular conveyor belt. One commonly used system for retaining a hinge rod employs a finger-like retainer having a fixed end secured to some portion of the module and a free end. The retainer can flex about the fixed end between a position in which the free end extends across the path of axial movement of a hinge rod disposed in the module to prevent retraction of the hinge rod from the module, and a position in which the free end of the retainer is disposed out of the path of axial movement of the hinge rod to permit the hinge rod to be retracted from the module.

When a modular conveyor belt equipped with such a retainer is being serviced and a technician desires to remove a hinge rod from the conveyor belt, it is common for the technician to move the retainer between the two positions by exerting a prying force on the retainer using a rigid member such as a screwdriver. This method of bending the retainer may not cause a problem if the prying force is exerted near the free end of the retainer, but if the prying force is applied near the fixed end or near the midportion of the retainer, the retainer can easily be subjected to stresses which exceed its design stress. As a result, the retainer may undergo plastic deformation of an extent such that it cannot return to a position in which it prevents retraction of a hinge rod, and it may even undergo structural failure, i.e., it may break. In either case, the retainer can no longer retain a hinge rod in the conveyor belt.

SUMMARY OF THE INVENTION

This invention provides a module for a modular conveyor belt which can prevent a hinge rod retainer from being damaged during the process of removing a hinge rod from the module.

This invention also provides a modular conveyor belt employing such a module.

This invention additionally provides a method of removing a hinge rod from a conveyor belt module.

According to one form of the present invention, a module for a modular conveyor belt includes a retainer which is bendable between a first position in which the retainer prevents a hinge rod from being withdrawn from a bore of the module and a second position in which a hinge rod can pass over the retainer to be withdrawn from the bore. The module further includes a stopper which can support at least a portion of the retainer between its fixed end and its free end when the retainer is in its second position.

The stopper can support the retainer such that a prying force can be applied to the retainer opposite the stopper without producing any substantial increase in bending stresses in the retainer. The dimensions of the stopper are selected such that the stresses within the retainer when the retainer is supported by the stopper are within the design stress of the retainer. The design stress of the retainer refers to a stress at which the retainer does not undergo structural failure, i.e., break, and at which any plastic deformation of the retainer is of an extent that when a force pressing the retainer towards the stopper is released, the retainer can return to a position in which the free end of the retainer can prevent a hinge rod from being withdrawn from the bore in the module. As such, the stopper can prevent the retainer from being damaged by a technician during the process of removing a hinge rod from the module, whereby the module can be used for long periods without needing to be replaced.

According to another form of the present invention, a module for a modular conveyor belt includes a retainer which is bendable about a fixed end between a first position in which the retainer can prevent a hinge rod from being withdrawn from a bore in the module and a second position in which a hinge rod can pass over the retainer to be withdrawn from the bore and in which a stopper contacts a bottom surface of the retainer at a point in a middle 50% of the length of the retainer without the retainer exceeding its design stress.

According to yet another form of the present invention, a module for a modular conveyor belt includes a retainer which is bendable about a fixed end of the retainer to move a free end of the retainer into or out of overlap with a bore of the module in a radial direction of the bore, and a stopper opposing a bottom surface of the retainer. The retainer is able to contact the stopper at a point in a middle 50% of the length of the retainer without the retainer exceeding its design stress.

According to another form of the present invention, a module for a modular conveyor belt includes a retainer which is bendable about a fixed end of the retainer between a first position in which the retainer can prevent a hinge rod from being withdrawn from a bore and a second position in which a hinge rod can pass over the retainer to be withdrawn from the bore. The module includes a first surface movable with the retainer as the retainer bends between its first and second positions and a second surface which opposes the first surface and contacts the first surface in a middle 50% of the length of the retainer when the retainer is in its second position without the retainer exceeding its design stress.

According to still another form of the present invention, a method of removing a hinge rod from a conveyor belt module includes applying a force to a retainer of the module to bend the retainer from a first position in which the retainer lies across a path of axial movement of the hinge rod to a second position in which the retainer lies outside a path of axial movement of the hinge rod and in which a bottom surface of the retainer contacts an upper surface of a stopper opposing the bottom surface of the retainer at a point in a middle 50% of a length of the retainer without the retainer exceeds its design stress, and moving the hinge rod in its axial direction to pass the hinge rod over the retainer.

According to yet another form of the present invention, a modular conveyor belt includes a plurality of modules connected in series, with at least one of the modules being a module according to the present invention.

DESCRIPTION OF PREFERRED EMBODIMENTS

Figure 1:
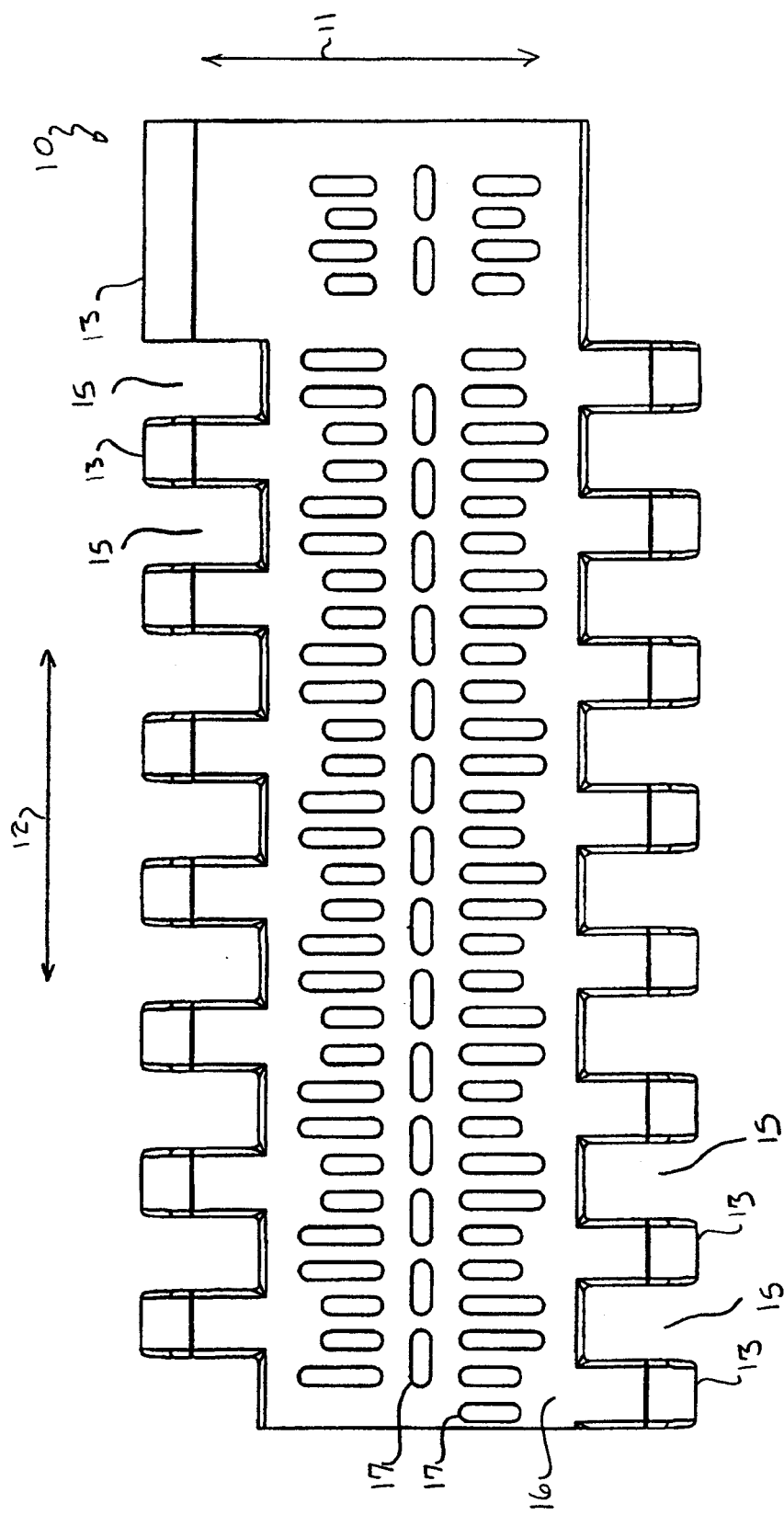
FIG. 1 is a top plan view of an embodiment of a module for a modular conveyor belt according to the present invention.
Figure 2:
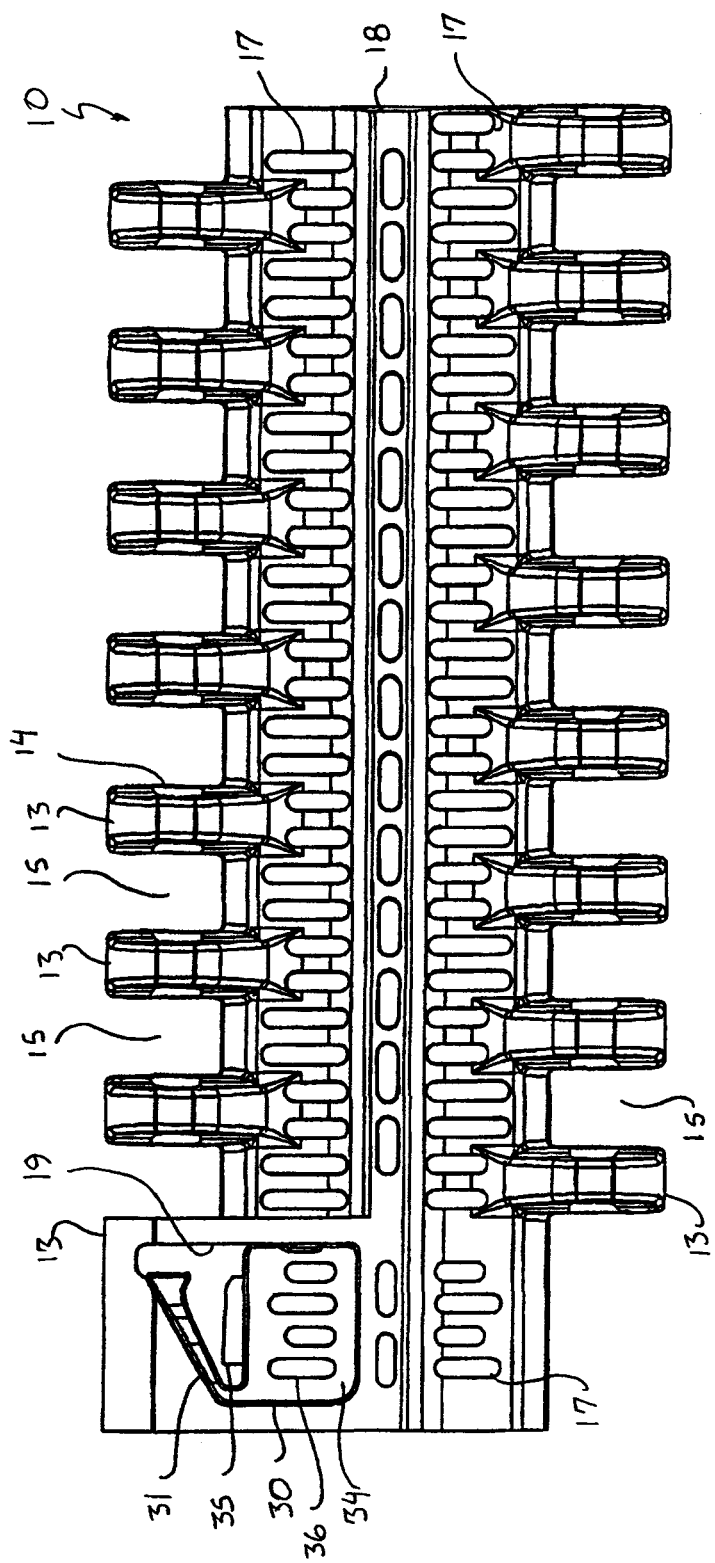
FIG. 2 is a bottom plan view of the module of FIG. 1.

FIGS. 1 and 2 are top and bottom plan views, respectively, of an embodiment of a module 10 for a modular conveyor belt according to the present invention. As long as the module 10 has a retainer which can be flexed between a position in which it can prevent retraction of a hinge rod from the module and a position in which it permits a hinge rod to be retracted from the module, there are no particular restrictions on the shape of the module. For example, it can have the same overall shape as a wide variety of existing modules for modular conveyor belts. As such, the shape of the module 10 shown in FIGS. 1 and 2 is merely one example of many possible shapes. The illustrated module 10 has the same overall shape as that of a Series 800 Perforated Flat Top 295 module sold by Intralox, L.L.C. of Harahan, La. This module 10 has a generally rectangular outer periphery as viewed in plan and includes first and second lengthwise ends and first and second widthwise ends. In this description, the lengthwise direction of the module 10 (shown by arrow 11 in FIG. 1) is parallel to the direction in which the module 10 travels when it is part of a conveyor belt, and the widthwise direction of the module 10 (shown by arrow 12 in FIG. 1) is perpendicular to the lengthwise direction 11.

Each lengthwise end of the module 10 is equipped with at least one bore 14 for receiving a hinge rod by which the module 10 can be pivotably connected to a similar module. Although a single bore is sufficient to pivotably connect a module to another module, a module will typically have a plurality of aligned bores spaced in the widthwise direction of the module in each of its lengthwise ends. In this embodiment, the bores 14 are formed in a plurality of finger-like projections 13 (referred to below as "hinge eyes", which is a commonly-used term for such projections) formed along the lengthwise edges of the module 10. Adjoining hinge eyes 13 are separated from each other by a space 15 into which a hinge eye of an adjoining module can be inserted when two modules are being connected end to end to form part of a modular conveyor belt.

As shown in FIG. 1, the module 10 has a top surface 16 which extends between the lengthwise ends of the module 10 and which is used to support objects atop the module 10. Depending upon the objects which are to be transported and the environment of use, the top surface 16 may include drainage openings 17 through which liquids or gas can pass between the top and bottom sides of the module 10. The top surface 16 of the illustrated module 10 is substantially planar, but like many conventional modules, it may instead have members extending upwards from it, such as cones, rollers, nubs, or ribs for supporting objects so that the top surface is not completely flat to prevent adhesion of the objects to the top surface of the module, to reduce or increase friction, or to provide ventilation, for example.

The illustrated module 10 has a shape generally resembling a block from which the hinge eyes 13 extend outwards in the lengthwise direction of the module 10, with the gaps 15 between adjoining hinge eyes 13 extending over a relatively small portion of the length of the module 10. However, a grid-like structure in which the gaps between adjoining hinge eyes extend close to the lengthwise center of a module (like, for example, the structures of the Series 900 open grid or flush grid modules sold by Intralox, L.L.C.) can also be employed.

Figure 3:
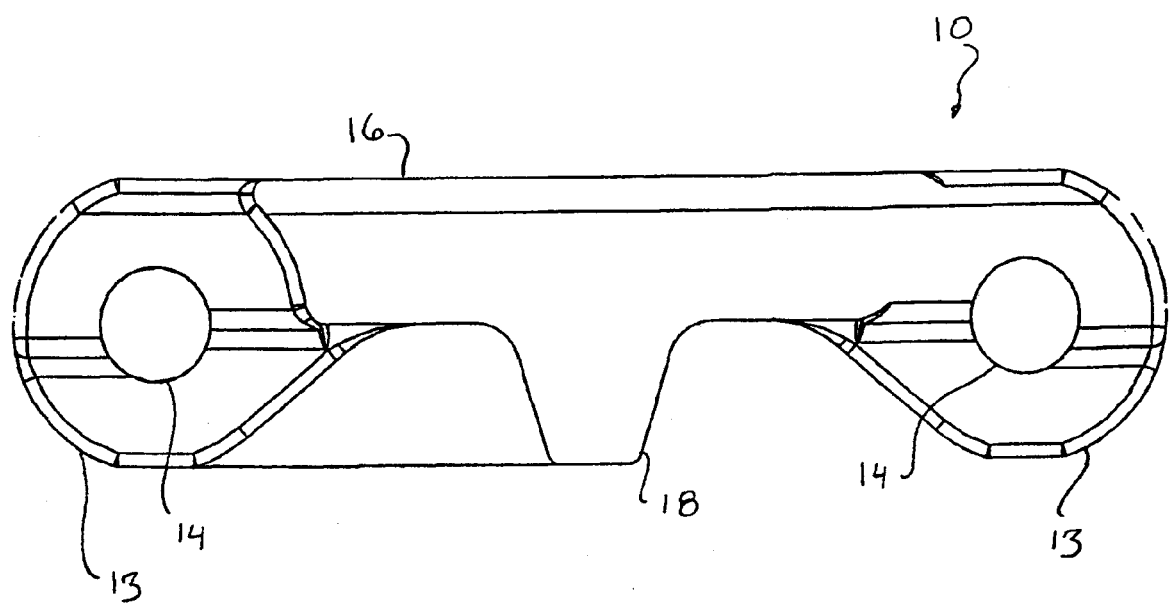
FIG. 3 is an elevation of one of the widthwise ends of the module of FIG. 1.

A modular conveyor belt is typically driven along a path by a plurality of drive sprockets which drivingly engage with the lower surface of each module in the conveyor belt. A module 10 of a conveyor belt according to the present invention is not limited to use with any particular type of drive sprocket, so various shapes can be employed for the lower surface of the module 10 in accordance with the type of drive sprocket to be employed. The illustrated module 10 is of the so-called center-driven type in which a drive sprocket transmits a drive force to the module 10 at a point between the lengthwise ends of the module. Alternatively, it may be a hinge-driven type in which a drive force is transmitted to the module in the vicinity of the hinge rods connecting adjoining modules, or a center and hinge-driven type, which is hinge-driven when moving in a first direction and center-driven when moving in the opposite direction. A drive sprocket for use with the module 10 of FIG. 1 typically has a plurality of teeth separated by spaces, with each tooth having a notch formed therein. As shown in FIG. 3, which is an elevation of a widthwise end of the module 10 of FIG. 1, the lower surface of this module 10 has a downward projection 18 at approximately midway along the length of the module 10 and extending in the widthwise direction of the module 10. This projection 18 can engage with the notches in the teeth of a drive sprocket. Typically a plurality of drive sprockets are mounted on a common drive shaft and spaced from each other along the length of the drive shaft, i.e., in the widthwise direction of the conveyor belt. The drive shaft is rotated by a suitable drive mechanism, examples of which are well known to those skilled in the art.

There are no restrictions on the dimensions of the module. As an example, a typical Series 800 Perforated Flat Top 295 module on which the illustrated embodiment is based has a length (defined as the distance between the axes of the bores 14 at one lengthwise end of the module and the axes of the bores 14 at the other lengthwise end of the module) of 2 inches and a height of $\frac{5}{8}$ inches. The width of the module depends upon the particular use of the module, with 5 to 12 inches being examples of common widths.

As shown in FIG. 2, at one of its widthwise ends, the module 10 includes a flexible finger-like retainer 31 for retaining a hinge rod in the bores 14 in the hinge eyes 13. When a single module is intended to extend across the entire width of a conveyor belt, it is also possible for a module 10 to have a retainer 31 at each of its lengthwise ends. In some modules, such as in modules described by U.S. Pat. No. 6,499,587, the disclosure of which is incorporated by reference, a retainer is integrally formed with adjoining portions of the module by injection molding. In other modules, such as in modules described by U.S. Pat. No. 7,255,227, the disclosure of which is incorporated by reference, a retainer can be separately formed from the adjoining portions of the module and attached to the module by suitable means, such as bonding, rivets, screws, or interfitting parts. Either of these arrangements can be employed for a retainer 31 of a module according to the present invention. In the present embodiment, the retainer 31 is part of a retainer unit 30 which is separately formed from the rest of the module 10. Forming the retainer unit 30 separately from other portions of the module 10 enables the retainer 31 to be made from a different material from the rest of the module 10 and can facilitate manufacture of the retainer 31.

Figure 4:
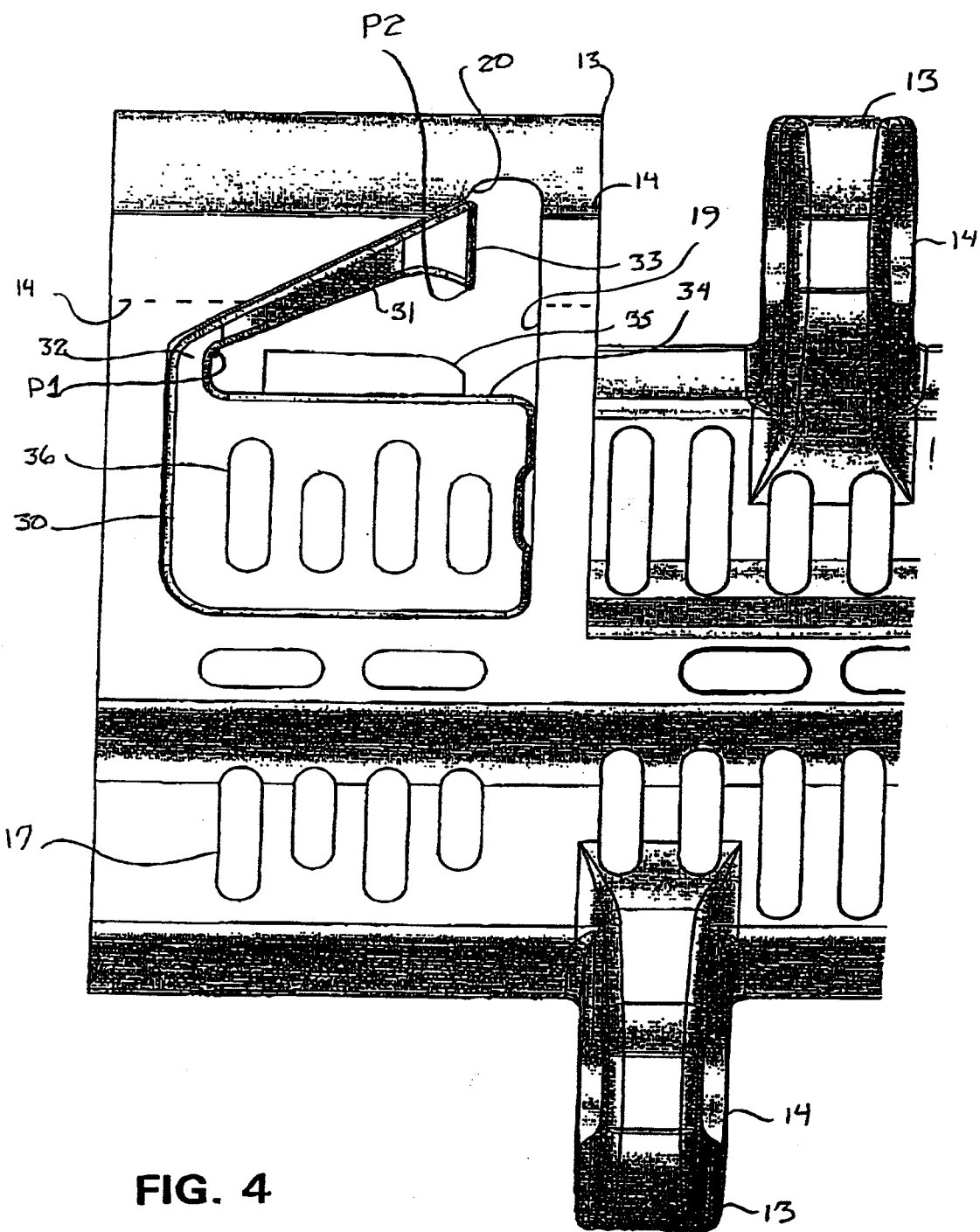
FIG. 4 is an enlarged bottom plan view of the left widthwise end of the module of FIG. 2 when the free end of the retainer is in a position in which it can block the path of a hinge rod.
Figure 5:
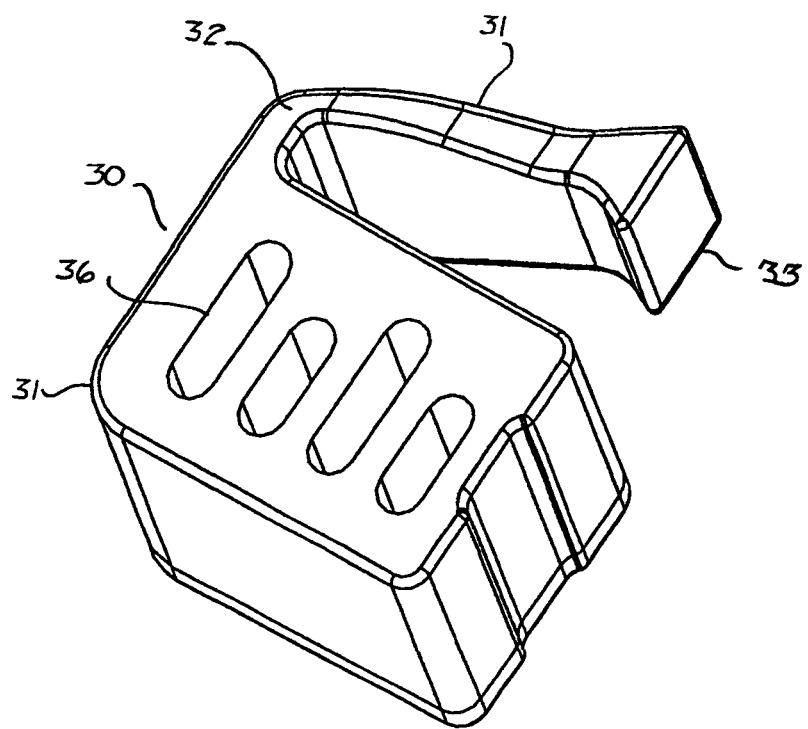
FIG. 5 is an enlarged axonometric view of the retainer unit shown in FIG. 4 removed from the module.

The structure of the retainer unit 30 is best shown in FIGS. 4 and 5. FIG. 4 is an enlarged bottom plan view of a portion of the module 10 of FIG. 2 when the retainer 31 of the retainer unit 30 is in a position in which it extends across the path of axial movement of a hinge rod and can prevent a hinge rod from being withdrawn from the module 10, and FIG. 5 is an enlarged axonometric view of the retainer unit 30 removed from the module 10. The retainer unit 30 includes a base 34 and the retainer 31. The retainer 31 includes a fixed end 32 which is secured to the base 34 and a free end 33 which is closer to the widthwise center of the module 10 than is the fixed end 32. The retainer 31 can be flexed about its fixed end 32 between a position in which the free end 33 of the retainer 31 overlaps the bores 14 in the hinge eyes 13 in the radial direction of the bores 14 sufficiently far that the free end 33 extends across the path of movement of a hinge rod disposed in the bores 14 and can prevent a hinge rod from being retracted from the bores 14, and a position such that a hinge rod can be inserted into or removed from the bores 14 in the hinge eyes 13 by passing over the top of the retainer 31. When no external force is acting on the retainer 31, its natural shape is such that it assumes a position, such as the position shown in FIG. 4, in which it prevents retraction of a hinge rod from the module 10. Like other portions of the module 10, the retainer unit 30 may include drainage openings 36 for fluids.

The retainer unit 30 is housed in a cavity 19 formed in one of the hinge eyes 13 at a widthwise end of the module 10. The cavity 19 opens onto the bottom surface of the module 10 and extends at least partway through the thickness of the module 10. The shape of the cavity 19 in this embodiment is selected so as to closely surround the base 34 of the retainer unit 30 on three sides and to extend parallel to and in close proximity to the upper surface of the retainer 31 at the upper end of the cavity 19 when the retainer 31 is in a position in which it prevents retraction of a hinge rod from the bores 14. The height of the cavity 19 measured in the lengthwise direction of the module 10 from the lower wall to the upper wall 20 of the cavity 19 (which extends alongside the upper surface of the retainer 31) increases from the fixed end 32 towards the free end 33 of the retainer 31. The cavity 19 need not have this shape, but giving the cavity 19 a height which decreases from the free end 33 towards the fixed end 32 of the retainer 31 makes it more difficult to insert an object (such as a screwdriver) into the cavity 19 near the fixed end 32 of the retainer 31 and thereby makes it more difficult to apply a shearing load to the retainer 31 in this location. In the state shown in FIG. 4, the upper surface of the retainer 31 is substantially parallel to the upper wall 20 of the cavity 19 where they oppose each other.

The cavity 19 may extend all the way through the thickness of the module 10 to enable the retainer 31 to be accessed from either the top or bottom of the module 10. In the illustrated example, the cavity 19 extends only partway through the thickness of the module 10 so as to provide a smoother surface on the top of the module 10 and avoid the possibility of objects which are being transported by the module 10 catching on the retainer 31 or falling into and collecting in the cavity 19.

The free end 33 of the retainer 31 is preferably shaped so that if a hinge rod is pressed against the free end 33 from the right side in FIG. 4, the force of the hinge rod will press the retainer 31 against the upper wall 20 of the cavity 19 rather than downwards towards the base 34 of the retainer unit 30. When the retainer 31 is pressed against the upper wall 20 of the cavity 19, the free end 33 of the retainer 31 continues to block the path of a hinge rod.

The base 34 of the retainer unit 30 acts as a support for the retainer 31 and makes the retainer 31 easier to handle and install in the module 10 by providing a portion which is easier to grasp than the retainer 31. It also provides a large surface area for joining the retainer unit 30 to the cavity 19 of the module 10. In the present embodiment, the base 34 has a simple rectangular shape as viewed in plan. Such a shape is easy to manufacture and enables the cavity 19 for housing the retainer unit 30 to also have a simple shape which is easy to manufacture. However, the base 34 is not restricted to any particular shape. A few examples of other possible shapes for the base 34 as viewed in plan are a circular, oval, or nonrectangular polygonal shape.

As stated earlier, when a technician is servicing a modular conveyor belt and removing a hinge rod from a conventional conveyor belt module equipped with a retainer, it is common for the technician to insert a screwdriver or similar object between the retainer and an adjoining surface of the module and exert a prying force on the retainer to move the free end of the retainer out of the path of movement of the hinge rod. If the force is applied to the midportion of the retainer between its fixed and its free end and the midportion is not supported from below in some way, the resulting stresses applied to the retainer can exceed the design stress of the retainer and make it impossible for the retainer to return to a position in which it extends across the path of movement of a hinge rod. Therefore, the illustrated module 10 is equipped with a stopper 35 for restricting the amount of bending deformation that the retainer 31 can undergo to an amount such that the stresses in the retainer 31 when deformed by this amount are within the design stress of the retainer 31. When the retainer 31 has been bent about its fixed end 32 by the prescribed amount, the stopper 35 can support the retainer 31 at at least one point in the midportion of the retainer 31, i.e., in the middle 50% of the length of the retainer 31 and resist further bending deformation of the retainer 31.

The length of the retainer 31 as defined here is the distance measured along the bottom surface of the retainer 31 between the free end 33 and the point closest to the fixed end 32 where a line normal to the lower surface has a component extending in the lengthwise direction of the module (in the vertical direction in FIG. 4) towards the remote lengthwise end of the module 10. Referring to FIG. 4, the length of the illustrated retainer 31 is the distance between point P1 near to the fixed end 32 and point P2 at the free end 33 of the retainer 31. The middle 50% of the length is a region centered between points P1 and P2 and having a length which is ½ the length of the retainer.

The middle 50% of the length of the retainer 31 is the region where a prying force is most likely to be applied to the retainer 31, so it is preferable that the stopper 35 can support the retainer 31 at at least one point in the middle 50% of the length. However, the stopper 35 is not limited to being disposed in the middle 50% of the length of the retainer 31, and it may extend over the entire length of the retainer 31 or even further.

The stopper 35 can have any shape which enables the stopper 35 to firmly support the retainer 31 and particularly the midportion of the retainer 31 so as to limit the amount of bending deformation of the retainer 31 to a prescribed amount. There may be a single stopper, or a plurality of stoppers may be used in combination to support a retainer 31 at different locations along its length. In this embodiment, a single stopper 35 is provided opposite the bottom surface of the retainer 31, and the bottom surface of the retainer 31 can move into and out of contact with the top surface of the stopper 35. Alternatively, one or more stoppers may be secured to the bottom surface of the retainer 31 opposing the base 34 of the retainer unit 30 and move together with the retainer 31 into and out of contact with the top surface of the base 34.

Figure 6:
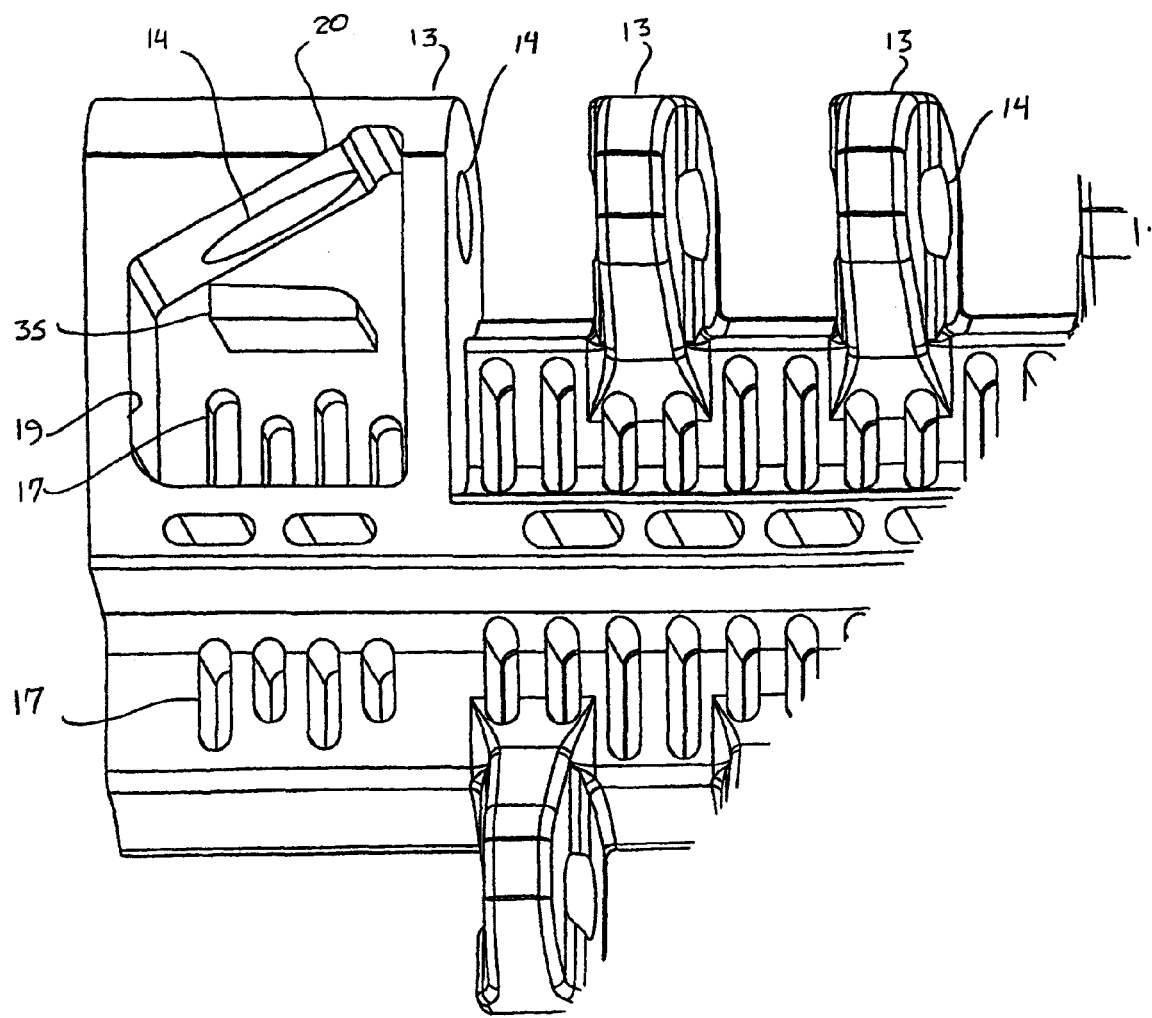
FIG. 6 is an enlarged axonometric view of the left widthwise end of the module of FIG. 2 with the retainer unit removed from the module.

The stopper 35 may be part of or formed separately from the retainer unit 30. As shown in FIG. 6, which is an enlarged axonometric view of one of the widthwise ends of the module 10 of FIG. 2 with the retainer unit 30 removed, in this embodiment, the stopper 35 is formed separately from the retainer unit 30 and extends upwards from the floor of the cavity 19 which houses the retainer unit 30. The stopper 35 may be formed integrally with the floor of the cavity 19, such as by molding, or it may be separately formed from the cavity 19 and then secured to the floor of the cavity 19 by any convenient method, such as by ultrasonic welding. The retainer unit 30 can be inserted into the space in the cavity 19 between the bottom surface of the stopper 35 and the lower wall of the cavity 19 and secured to the inside of the cavity 19, such as by ultrasonic welding, a press fit, a snap fit, etc. The floor of the cavity 19 may have drainage openings 17 which fluidly communicate with the drainage openings 36 formed in the base 34 of the retainer unit 30 when the retainer unit 30 is inserted into the cavity 19. Forming the stopper 35 separately from the retainer unit 30 as in this embodiment makes it easier to form the retainer unit 30, since there is more space between the base 34 of the retainer unit 30 and the bottom surface of the retainer 31, particularly near the fixed end 32 of the retainer 31, than if the stopper 35 were formed integrally with the base 35 or the retainer 31, and this additional space facilitates injection molding of the retainer unit 30.

Instead of the stopper 35 being secured to the floor of the cavity 19, it may be mounted on the retainer unit 30. For example, the stopper 35 may be formed separately from the retainer unit 30 and then secured to the top surface of the base 34 of the retainer unit 30 either before or after the retainer unit 30 is inserted into the cavity 19. However, forming the stopper 35 integrally with the floor of the cavity 19 makes it unnecessary to perform an additional step of securing the stopper 35 to the retainer unit 30.

The stopper 35 may support the retainer 31 in a variety of ways as long as it can provide support at least in the middle 50% of the length of the retainer 31. For example, it may support the retainer 31 at a single point in the middle 50% of the length of the retainer 31, at a plurality of discrete points spaced from each other along the length of the retainer 31 and including at least one point in the middle 50% of the length of the retainer 31, in one or more continuous regions along the length of the retainer 31, or at a combination of one or more discrete points and in one or more continuous regions. A region of continuous contact between the stopper 35 and the retainer 31 provides more uniform support for the retainer 31 by the stopper 35 than does a region of noncontinuous contact. Preferably the stopper 35 can continuously contact the retainer 31 over at least 10% of the length of the bottom surface of the retainer 31 between the fixed end 32 and the free end 33 of the retainer 31. The stopper 35 can be still more uniformly supported if the stopper 35 can continuously contact the retainer 31 over at least 50% of the length of the bottom surface of the retainer 31 between the fixed end and the free end of the retainer 31. In the present embodiment, the stopper 35 can be in continuous contact with the retainer 31 over the entire length of the stopper 35, which corresponds to approximately 75% of the length of the retainer 31.

When the top surface of the stopper 35 and the bottom surface of the retainer 31 are intended to be in continuous contact over a portion of their lengths, the opposing regions which are intended to be in continuous contact preferably have complementary contours. For example, if one surface is convex, the opposing surface may be concave with the same contour as the convex surface, or both opposing surfaces may have straight line contours extending parallel to each other when the retainer 31 and the stopper 35 contact each other. In the present embodiment, the bottom surface of the retainer 31 has a straight line contour in an unbent state (such as in the state shown in FIG. 5) over a portion of its length, and the top surface of the stopper 35 likewise has a straight line contour which is complementary to that of the bottom surface of the retainer 31 over a region beginning at its left end in FIG. 4. Near its free end 33, the bottom surface of the retainer 31 has a concave contour. At its right end, the upper surface of the stopper 35 has a convex contour which is complementary to the concave contour of the retainer 31.

There is no restriction on the overall length of the stopper 35. The stopper 35 may extend all the way to the fixed end 32 of the retainer 31, but as in the present embodiment, a gap may be left between the fixed end and the left end of the stopper 35 to facilitate insertion of the retainer unit 30, for example. There may likewise be a gap between the right end of the stopper 35 and the free end 33 of the retainer 31. Alternatively, it is also possible for the stopper 35 to extend to or beyond the free end 33 and have a recess for receiving the free end 33.

The height of the stopper 35 as measured in the lengthwise direction of the module 10 from the base 34 of the retainer unit 30 can be constant or vary over the length of the stopper 35 as measured in the widthwise direction of the module 10. In the illustrated embodiment, the upper surface of the stopper 35 has a slight linear taper, with the height of the stopper 35 slightly decreasing in a linear manner from the end of the stopper 35 closest to the fixed end 32 of the retainer 31 towards the opposite end of the stopper 35.

There are no restrictions on the material of which the retainer 31 is made as long as it is capable of repeatedly bending into and out of the path of axial movement of a hinge rod. For example, plastic, metals, and combinations thereof can be employed, and the same materials as have been proposed in the past for retainers of conveyor belt modules are suitable in the present invention. The retainer 31 and the base 34 of the retainer unit 30 may be formed integrally with each other, or they may be separately formed and then attached to each other by a suitable method. When they are formed of the same material, it is often desirable to integrally form the entire retainer unit 30 as a single body by injection molding.

Figure 7:
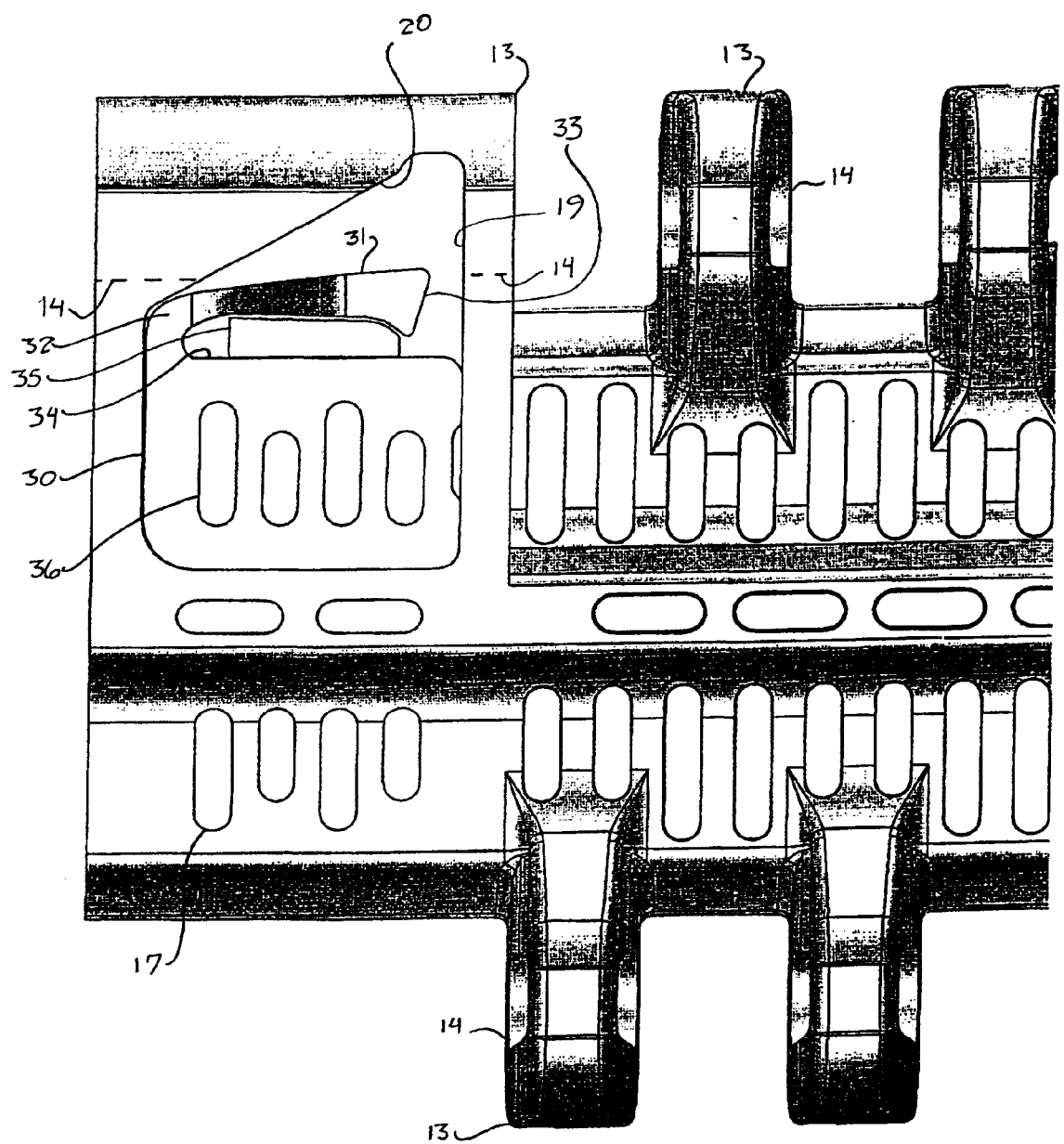
FIG. 7 is an enlarged bottom plan view of the left widthwise end of the module of FIG. 2 when the retainer has been deformed to a position in which it contacts the stopper.

FIG. 7 is a view similar to FIG. 4 showing the state in which the retainer 31 is being been bent by an unillustrated member, such as a screwdriver, about its fixed end 32 far enough to contact the top surface of the stopper 35. When the retainer 31 contacts the stopper 35, the retainer 31 has been bent sufficiently far from the position shown in FIG. 4 that a hinge rod can pass over the top of the retainer 31 to be inserted into or refracted from the module 10 but at which the stresses in the retainer 31 are within its design stress. It is possible for the amount of bending of the retainer 31 when it contacts the stopper 35 to be greater than the minimum amount of bending of the retainer 31 needed for a hinge rod to pass over the retainer 31. In other words, when the retainer 31 has been bent far enough for a hinge rod to pass over the retainer 31, there may still be a gap between the retainer 31 and the stopper 35. However, when a technician is exerting a prying force on the retainer 31 to move the retainer 31 out of the path of a hinge rod in order to retract the hinge rod from the module 10, the technician will often bend the retainer 31 until it contacts the stopper 35 since it is difficult for the technician to precisely control the force which he is applying.

The deformation of the retainer 31 when it has been pressed into contact with the stopper 35 as shown in FIG. 7 may be entirely elastic deformation, or it may include plastic deformation in a portion of the retainer 31 as long as the stresses producing this deformation are within the design stress of the retainer 31, i.e., as long as the retainer 31 can automatically return to a position in which the free end 33 of the retainer 31 overlaps the bores 14 in the radial direction and the free end 33 extends across the path of movement of a hinge rod when a force pressing the retainer 31 towards the stopper 35 is released. In other words, it is not necessary for the retainer 31 to return all the way to a position like that shown in FIG. 4 in order for the retainer 31 to function effectively and prevent retraction of a hinge rod.

The stopper 35 may be made sufficiently rigid to resist by itself the forces acting on it when the retainer 31 is pressed against it by a prying force so as to prevent further bending deformation of the retainer 31. Alternatively, the stopper 35 may be pressed against the base 34 of the retainer unit 30 and act in conjunction with the base 34 to resist the forces acting on a retainer 31 pressed against the stopper 35. The stopper 35 may be so rigid as to undergo essentially no perceptible bending or compression under the forces applied to it by the retainer 31 when the retainer 31 is pressed against it, so that when a portion of the retainer 31 contacts the upper surface of the stopper 35, that portion of the retainer 31 is prevented by the stopper 35 from undergoing substantially any further bending deformation. However, it is also possible for the stopper 35 to initially undergo a certain amount of deformation when first contacted by the retainer 31, with the resistance to deformation of the stopper 35 increasing as the stopper 35 deforms and eventually reaching a point at which the stopper 35 prevents any further bending deformation by the retainer 31.

The stopper 35 may be formed of the same or different materials from the retainer unit 30. Since the stopper 35 will typically undergo much less bending than the retainer 31, a wider range of materials may be suitable for the stopper 35 than for the retainer 31.

There are no limitations on the material of which other portions of the module 10 are made, but most commonly, the other portions of the module 10 will be formed as a single body by injection molding of plastic. Examples of plastics commonly used for injection molding of conveyor belt modules include polypropylene, polyethylene, and acetals. Glass-filled polypropylene is particularly suitable for the other portions of the module 10 (including the stopper 35) when the main structural portions of the module 10 require good strength in a hostile environment. Injection-molded polypropylene, without glass reinforcement, has good bending characteristics and is frequently suitable for the retainer unit 30.

Figure 8:
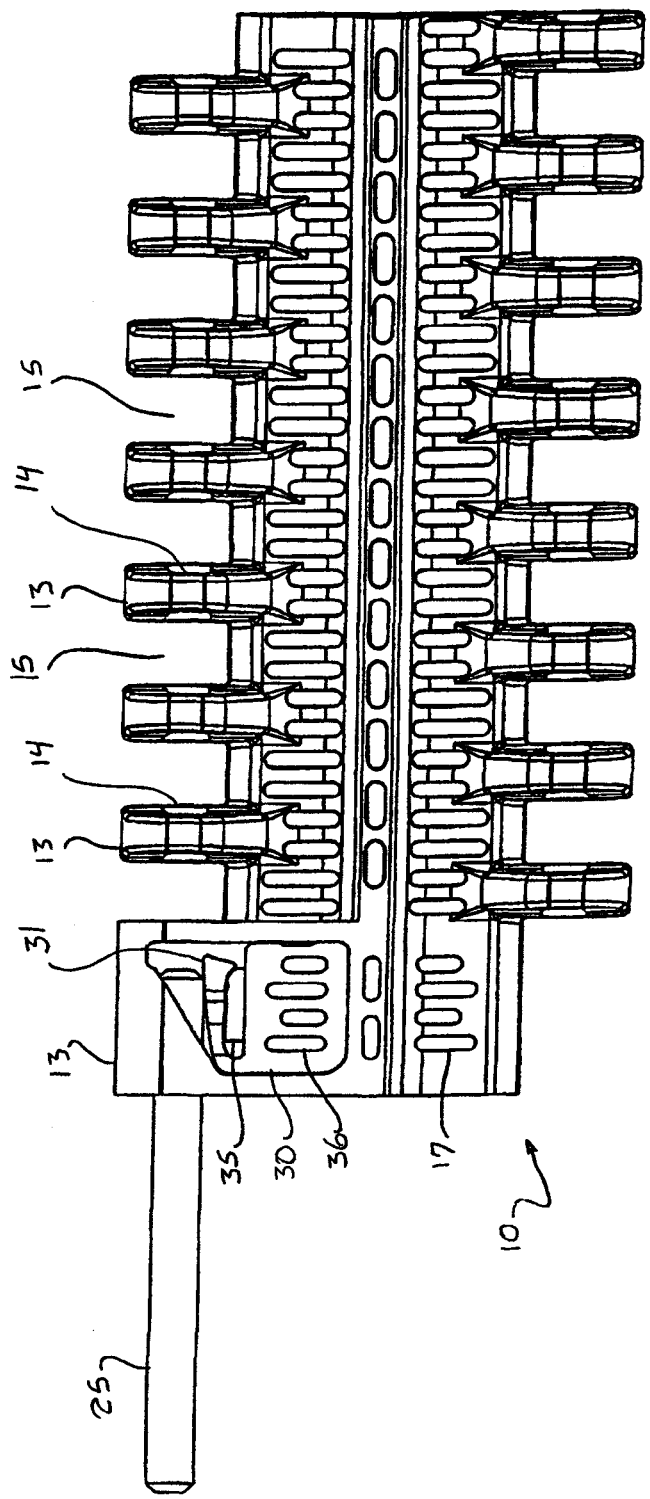
FIG. 8 is a bottom plan view of the module of FIG. 2 when a hinge rod is being inserted into the module.

FIG. 8 is a bottom plan view similar to FIG. 2 illustrating the process of installing a hinge rod 25 in the module 10. Typically this process will be performed when two modules are disposed end to end in series, with the bores 14 in the rear lengthwise end of one module aligned with the bores 14 in the front lengthwise end of the other module. However, for ease of understanding, FIG. 8 shows only a single module 10. When no external force is acting on the retainer 31, it assumes a position like that shown in FIG. 4, for example, in which the free end 33 of the retainer 31 overlaps the bores 14 in the hinge eyes 13 in the radial direction of the bores 14. To install the hinge rod 25, the hinge rod 25 is first inserted into the lefthand side of the bore 14 which opens into the left side of the cavity 19 which houses the retainer unit 30, and the hinge rod 25 is moved to the right and pressed against the upper surface of the retainer 31. The retainer 31 is usually sufficiently flexible that when an axial force is applied to the hinge rod 25 by hand, the retainer 31 can bend downwards by a sufficient amount so that the free end 33 of the retainer 31 does not obstruct the bores 14 in the hinge eyes 13 and the hinge rod 25 can slide over the top of the retainer 31 and be inserted into the bores 14. It is possible for the bottom surface of the retainer 31 to contact the top surface of the stopper 35 as the hinge rod 25 is being inserted, but since the amount of bending deformation of the retainer 31 at the time of insertion of the hinge rod 25 is well controlled by the dimensions of the bores 14 and the hinge rod 25, it is possible for there to be a clearance between the retainer 31 and the stopper 35 at this time. The hinge rod 25 continues to be inserted into the bores 14 until it completely passes over the retainer 31 and its left end moves to the right side of the free end 33 of the retainer 31. When the left end of the hinge rod 25 has passed over the retainer 31, the retainer 31 springs back to a position, such as that shown in FIG. 4, in which the free end 33 of the retainer 31 overlaps the bores 14 in the hinge eyes 13 in the radial direction of the bores 14 to block the axial movement of the hinge rod 25, thereby retaining the hinge rod 25 inside the module 10.

Figure 9:
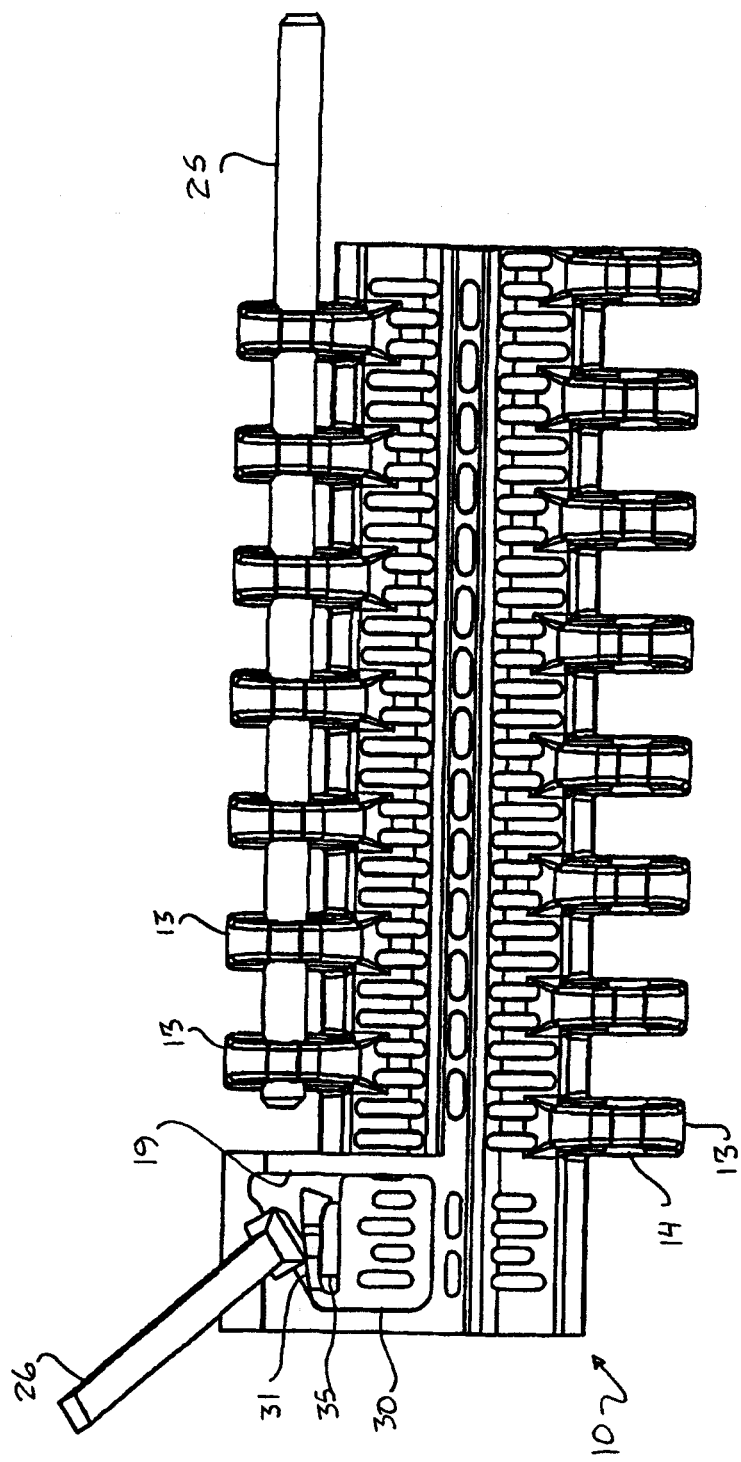
FIG. 9 is a bottom plan view of the module of FIG. 2 when a hinge rod is being removed from the module.

When it is desired to remove the hinge rod 25 from the module 10, as shown in FIG. 9, which is a bottom plan view of the module of FIG. 2, a technician typically inserts a tool, such as a screwdriver 26, between the upper wall 20 of the cavity 19 and the upper surface of the retainer 31 and exerts a prying force on the retainer 31 to flex it towards the base 34 of the retainer unit 30 to a position in which the retainer 31 no longer blocks the path of the hinge rod 25. With the retainer 31 held in this position by the screwdriver 26, an axial force is applied to the right end of the hinge rod 25 to slide the hinge rod 25 to the left in the figure until the left end of the hinge rod 25 is disposed above the free end 33 of the retainer 31. The screwdriver 26 can then be removed from the cavity 19, and the hinge rod 25 can be pushed to the left in FIG. 9 until it is completely withdrawn from the bores 14 while passing over the free end 33 of the retainer 31. When the right end of the hinge rod 25 has passed over the free end 33 of the retainer 31, the retainer 31 automatically returns to a position (such as the position shown in FIG. 4) in which the free end 33 of the retainer 31 overlaps the bores 14 in the module 10 in the radial direction.

When a technician is exerting a prying force on the retainer 31 with a screwdriver or other member, it is difficult for the technician to carefully control the amount of force which he is applying to the retainer 31 or the exact portion of the retainer 31 to which the force is being applied. In the absence of some support, the retainer 31 could easily be damaged by the prying force. Therefore, when the retainer 31 has flexed at least far enough to enable a hinge rod 25 to be retracted from the bores 14, the bottom surface of the retainer 31 contacts the upper surface of the stopper 35 at one or more points in the middle 50% of the length of the retainer 31, and the retainer 31 is prevented by the stopper 35 from undergoing further bending deformation. As stated above, the location and dimensions of the stopper 35 are such that the bending stresses which develop in the retainer 31 when the retainer 31 is supported by the stopper 35 are within the design stress of the retainer 31. If the technician increases the prying force applied to the retainer 31 when the retainer 31 is supported by the stopper 35, since the retainer 31 is prevented by the stopper 35 from undergoing further bending deformation, the increased prying force does not increase the bending stresses in the retainer 31 and primarily results in an increase in compressive stresses acting in the thickness direction of the retainer 31, which the retainer 31 can easily withstand without being damaged.

If a technician exerts a strong axial force on the right end of the hinge rod 25 in order to try to remove the hinge rod from the module 10 without first bending the retainer 31 downwards and out of the path of the hinge rod 25, contact between the left end of the hinge rod 25 and the free end 33 of the retainer 31 will cause the retainer 31 to be pressed upwards against the upper wall 20 of the cavity 19. In this state, the upper wall 20 of the cavity 19 will support the top surface of the retainer 31 and resist further bending of the retainer 31. This contact between the retainer 31 and the upper wall 20 of the cavity 19 prevents the retainer 31 from being damaged by bending under the force applied to it by the hinge rod 25.

Figure 10:
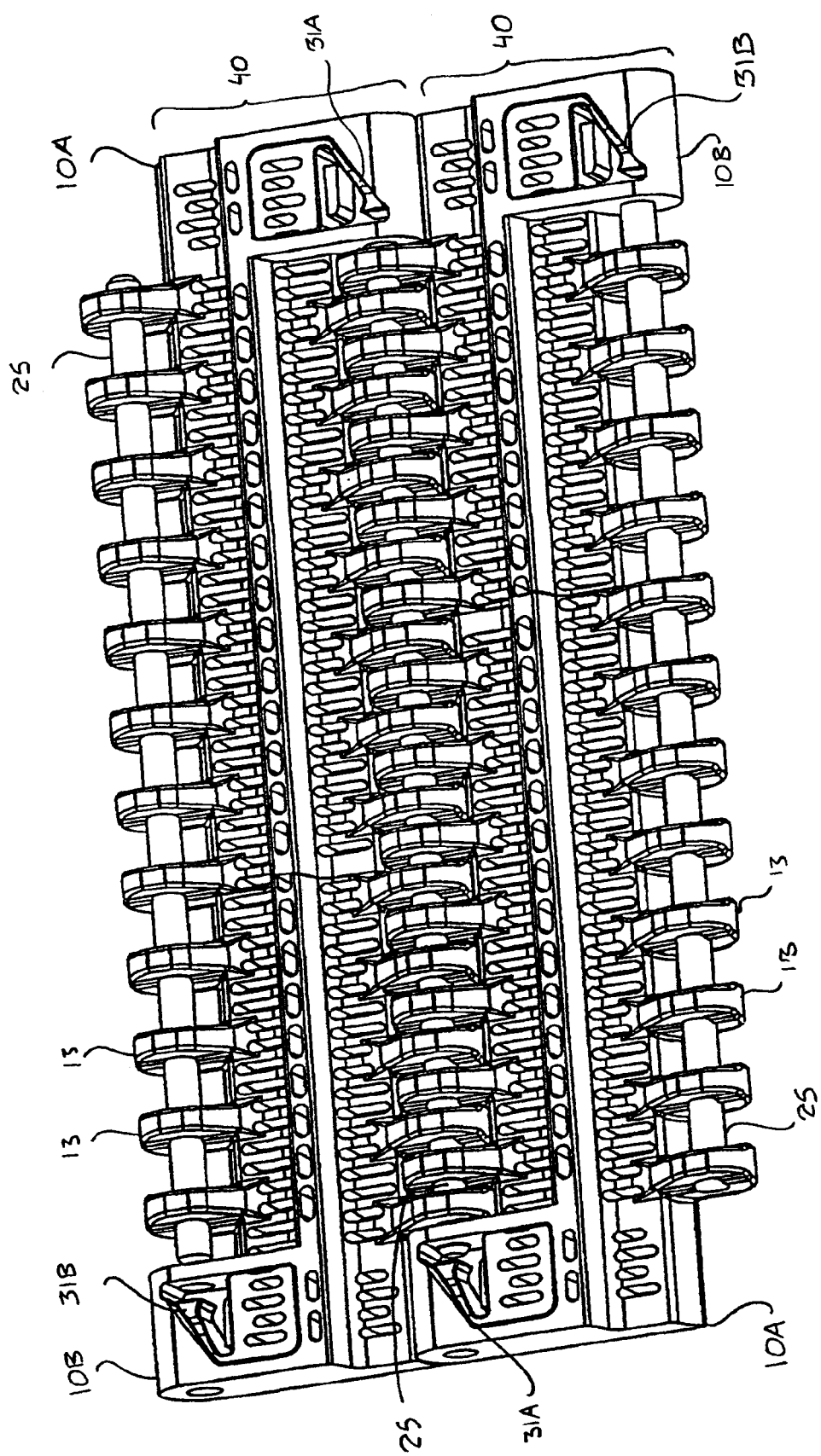
FIG. 10 is a bottom axonometric view of a plurality of rows of a modular conveyor belt comprising modules similar to the module of FIG. 2.

A modular conveyor belt according to the present invention includes a plurality of modules connected end to end in series, with at least one of the modules being a module according to the present invention. The conveyor belt may be composed entirely of modules according to the present invention, or it may include other types of modules or other members in series with one or more modules according to the present invention. A module according to the present invention can be incorporated into a conveyor belt in the same manner as a conventional module having a retainer 31. As an example, FIG. 10 illustrates one way in which a module according to the present invention can be incorporated into a conveyor belt. FIG. 10 is a bottom axonometric view of a plurality of modules according to the present invention connected in series to form a portion of a conveyor belt. FIG. 10 shows two rows 40 of modules pivotably connected to each other by a hinge rod 25. In this example, each row 40 includes two modules (a first or longer module 10A and a second or shorter module 10B) disposed side by side in the widthwise direction of the conveyor belt. The two modules 10A, 10B in each row 40 have the same structure as the module 10 of FIG. 1 and differ from each other primarily with respect to length. The first module 10A in each row 40 is rotated by 180 degrees in the plane of the rows 40 of modules with respect to the second module 10B in the same row 40, and each module is rotated by 180 degrees in the plane of the rows 40 of modules with respect to the corresponding module in the adjoining row 40. Namely, the orientation of the first modules 10A varies by 180 degrees between consecutive rows 40, and the orientation of the second modules 10B likewise varies by 180 degrees between consecutive rows 40. When the modules are formed by injection molding, the first and second modules 10A and 10B may be separately formed from separate molds in separate molding operations. However, it may be more economical to use a single mold corresponding to the first module 10A to mold a plurality of the first modules 10A and to then obtain the second modules 10B by cutting some of the first modules 10A to a suitable length. Any number of similar rows 40 can be connected in the same manner as shown in FIG. 10 to obtain a conveyor belt having a desired length. If the width of a row 40 needs to be greater than is capable of being provided by two modules disposed side by side, one or more additional modules can be inserted into the center of a row 40 between the modules at the widthwise ends of the rows 40 to achieve a row having a desired width. The modules at the center of a row 40 will typically not be equipped with a retainer.

In the arrangement shown in FIG. 10, one end of each hinge rod 25 is retained by a retainer 31A (having the same structure as the retainer 31 shown in FIG. 4) of one of the first modules 10A, and the other end of the hinge rod 25 is retained by a retainer 31B (having the same structure as retainer 31A) of one of the second modules 10B in the adjoining row 40. With this arrangement, a hinge rod 25 can be inserted into or removed from the modules from either widthwise end of a conveyor belt. However, it is also possible for there to be a retainer 31 according to the present invention at only one widthwise end of a row of modules, as long as some other means is provided at the opposite widthwise end to prevent a hinge rod 25 from inadvertently being withdrawn from that end of the row. In FIG. 10, each row of modules is connected to the adjoining row of modules by a single hinge rod 25, but a plurality of hinge rods 25 may be disposed end to end, without being connected to each other, and connect adjoining rows of modules.

What is claimed is:

1. A module for a modular conveyor belt comprising first and second lengthwise ends and first and second widthwise ends perpendicular to the first and second lengthwise ends, a top surface for supporting a load disposed between the first and second lengthwise ends, a bore for receiving a hinge rod formed at one of the first and second lengthwise ends, a retainer having a fixed end and a free end disposed closer than the fixed end to the widthwise center of the module, the retainer being bendable toward and away from the first lengthwise end between a first position in which the retainer prevents a hinge rod from being withdrawn from the bore and a second position in which a hinge rod can pass over the retainer to be withdrawn from the bore, and a stopper which supports the retainer at a location in a middle 50% of the length of the retainer when the retainer is in its second position.

2. A module as claimed in claim 1 wherein the retainer is movable with respect to the stopper into and out of contact with the stopper.

3. A module as claimed in claim 2 wherein a hinge rod can be withdrawn from the bore by passing over the retainer when the retainer is in a position in which the retainer is spaced from the stopper.

4. A module as claimed in claim 2 wherein the retainer and the stopper have opposing surfaces with complementary shapes.

5. A module as claimed in claim 2 wherein the stopper continuously contacts the retainer over at least 10% of the length of the retainer when the retainer is in its second position.

6. A module as claimed in claim 2 wherein the stopper continuously contacts the retainer over at least 50% of the length of the retainer when the retainer is in its second position.

7. A module as claimed in claim 1 wherein the retainer and the stopper are formed of different materials.

8. A module as claimed in claim 2 including a cavity communicating with the bore, wherein the stopper is secured to a floor of the cavity.

9. A module as claimed in claim 8 wherein the stopper is integrally formed with the floor of the cavity by molding.

10. A module as claimed in claim 8 including a retainer unit comprising the retainer and a base secured to the fixed end of the retainer, wherein the retainer unit is installed in the cavity with the stopper disposed between the base and the retainer.

11. A module as claimed in claim 8 wherein the cavity has a height which increases from the fixed end towards the free end of the retainer and an upper wall which is generally parallel to an upper surface of the retainer when the retainer is in its first position.

12. A module for a modular conveyor belt comprising first and second lengthwise ends and first and second widthwise ends perpendicular to the first and second lengthwise ends, a top surface for supporting a load disposed between the first and second lengthwise ends, a bore for receiving a hinge rod formed at one of the first and second lengthwise ends, a retainer having a fixed end and a free end disposed closer than the fixed end to the widthwise center of the module, and a stopper opposing the bottom surface of the retainer, the retainer being bendable about the fixed a first position in which the retainer can prevent a hinge rod from being withdrawn from the bore and a second position in which a hinge rod can pass over the retainer to be withdrawn from the bore and in which the stopper contacts a bottom surface of the retainer at a point in a middle 50% of the length of the retainer without the retainer exceeding its design stress.

13. An apparatus as claimed in claim 12 wherein the stopper can contact the bottom surface of the retainer at a point in the middle 50% of the length of the retainer without the retainer undergoing plastic deformation.

14. A modular conveyor belt comprising a plurality of modules pivotably connected in series by hinge rods and including a module as claimed in claim 1.

* * * * *